9086X
N. Richardson,
Bed Head-Section.
Patented Sept. 9, 1835
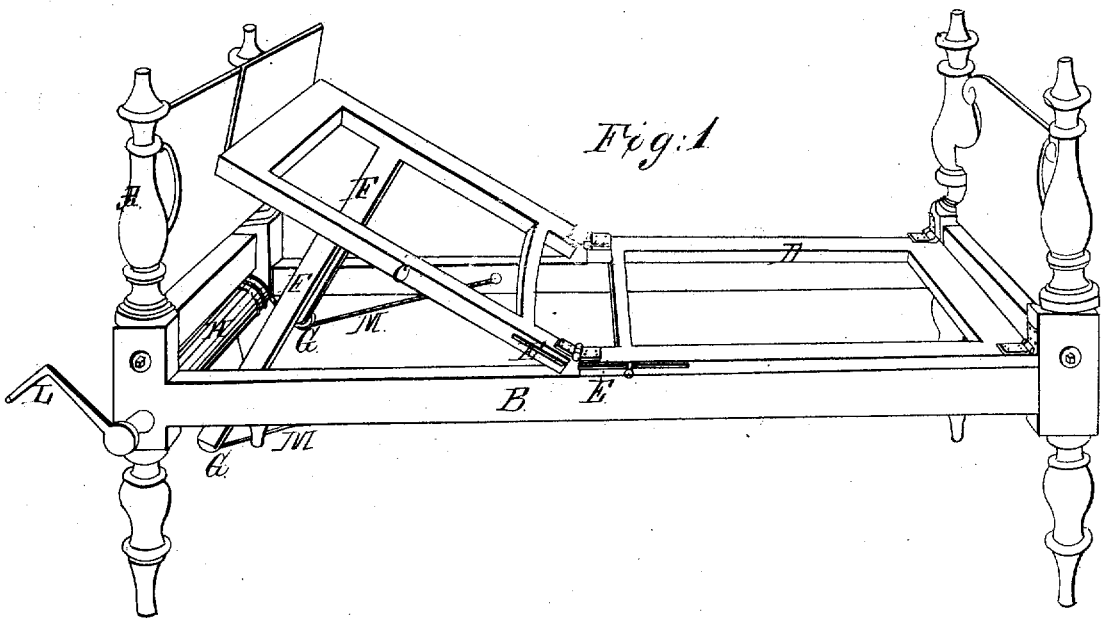
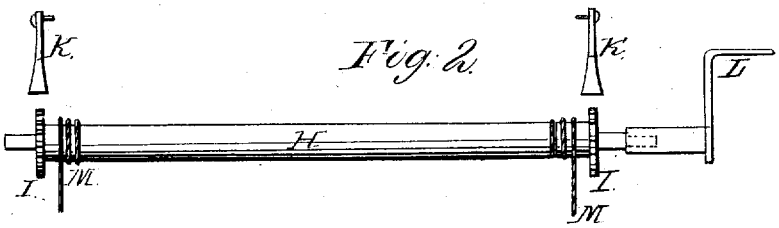
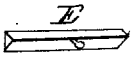
N. PETERS, PHOTO-LITHOGRAPHER, WASHINGTON, D. C.

Sept 4, 1835 [illegible]

Nathaniel Richardson — Boston

Letters Patent

The Schedule refered to in these Letters Patent and making part
of the same containing a description in the words of the said Nathaniel
Richardson himself of his improvement in the Bedstead for the
Sick called Richardsons Allevator Be it known that I Nathaniel Richardson of Boston County of
Suffolk and State of Massachusetts have made an improvement in the
Bedstead for the sick called "Richardsons Allevator" which is described ~~as~~
as follows. The posts and Rails of this Bedstead A & B are made similar
to those in common use. In fig 1 of the annexed drawing C and D.
represent moveable frames turning on hinges which may be elevated.
or depressed to any angle required. E Stat and Key by which the two
moveable frames may be firmly united when it is required to raise the
whole bed at the same time F F pieces of wood framed into the two
outside of the upper moveable frame with pulleys G. G. in their ends
turning on cords hereafter described. H revolving rail. I. I. ratchet
wheels ~~[illegible]~~ fixed on the ends of the revolving rail. K. K. palls
to secure the ratchet wheels L crank handles to turn the revol
ving rail. M. M. cords to raise the frame or frames one end of
each cord being fastened to the side Rail of the bedstead and the
other wound around the revolving rail. Operation. The frames
being put down upon the rails of the Bedstead and it is required
to raise the whole bed the key is inserted into the stat which se
cures the two frames together as one frame. the crank handle is
turned which turns the revolving rail and winds the cords around
it and thus raises the frame. The ratchet wheels and palls
secure the revolving rail from returning and the bed is thus kept
at any angle required. When it is desired to raise the upper half
of the bed alone. the key is removed from the slats and by the

9086X before described operation the lower half of the frame would re
main stationary whilst the upper half would be elevated
What I claim as my invention and desire to secure by Letters
Patent consists in the combination and arrangement of the parts
of the apparatus for elevating and depressing the bed as before described
but I claim no part of the Bedstead itself Witnesses
Robt. Clarke
Wm F. Elliot Nathaniel Richardson Exd
[illegible]

432 nos (Patented 9 September 1835)

(Drawing)